US011552778B2

United States Patent
Su et al.

(10) Patent No.: US 11,552,778 B2
(45) Date of Patent: Jan. 10, 2023

(54) METHOD OF MULTI-SENSOR DATA FUSION

(71) Applicant: APTIV TECHNOLOGIES LIMITED, St. Michael (BB)

(72) Inventors: Yu Su, Wuppertal (DE); Weimeng Zhu, Wuppertal (DE); Mirko Meuter, Erkrath (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 352 days.

(21) Appl. No.: 16/801,296

(22) Filed: Feb. 26, 2020

(65) Prior Publication Data
US 2020/0280429 A1    Sep. 3, 2020

(30) Foreign Application Priority Data
Mar. 1, 2019  (EP) ..................... 19160260

(51) Int. Cl.
*H04L 1/00*    (2006.01)
*H04L 7/00*    (2006.01)
(Continued)

(52) U.S. Cl.
CPC .......... *H04L 7/0029* (2013.01); *G06N 3/0436* (2013.01); *G06N 3/08* (2013.01);
(Continued)

(58) Field of Classification Search
CPC ... H04L 1/0057; H04L 7/0029; G06N 3/0436; G06N 3/08; B60W 2050/006; B60W 50/00
(Continued)

(56) References Cited

U.S. PATENT DOCUMENTS 10,509,947 B1 *  12/2019  Douillard ............... G06V 20/56
10,593,042 B1 *   3/2020  Douillard .............. G01S 7/4802
(Continued)

FOREIGN PATENT DOCUMENTS

EP    3 438 872 A1    2/2019

OTHER PUBLICATIONS

Schlosser Joel et al: "Fusing LIDAR and images for pedestrian detection using convolutional neural networks", 2016 IEEE International Conference On Robotics and Automation (ICRA), IEEE, May 16, 2016 (May 16, 2016), pp. 2198-2205, XP032908393, DOI: 10.1109/ICRA.2016.7487370.
(Continued)

*Primary Examiner* — Emmanuel Bayard
(74) *Attorney, Agent, or Firm* — Carlson, Gaskey & Olds, P.C.

(57) ABSTRACT

A method of multi-sensor data fusion includes determining a plurality of first data sets using a plurality of sensors, each of the first data sets being associated with a respective one of a plurality of sensor coordinate systems, and each of the sensor coordinate systems being defined in dependence of a respective one of a plurality of mounting positions for the sensors; transforming the first data sets into a plurality of second data sets using a transformation rule, each of the second data sets being associated with a unified coordinate system, the unified coordinate system being defined in dependence of at least one predetermined reference point; and determining at least one fused data set by fusing the second data sets.

17 Claims, 5 Drawing Sheets

(51) Int. Cl.
  *G06N 3/04* (2006.01)
  *G06N 3/08* (2006.01)
  *B60W 50/00* (2006.01)
(52) U.S. Cl.
  CPC ......... *H04L 1/0057* (2013.01); *B60W 50/00* (2013.01); *B60W 2050/006* (2013.01)
(58) Field of Classification Search
  USPC ............................. 375/229, 240.01; 370/216
  See application file for complete search history.

(56) References Cited

U.S. PATENT DOCUMENTS

| | | | |
|---|---|---|---|
| 11,151,447 B1* | 10/2021 | Chen | G01S 7/4021 |
| 2006/0123050 A1* | 6/2006 | Carmichael | G06T 7/35 |
| 2015/0097833 A1* | 4/2015 | Razeto | G06T 7/30 |
| | | | 345/424 |
| 2017/0344021 A1* | 11/2017 | Sano | G06K 9/6292 |
| 2018/0329066 A1* | 11/2018 | Pacala | G01S 17/931 |
| 2019/0258737 A1* | 8/2019 | Wang | G06V 20/56 |

OTHER PUBLICATIONS

Yu Chunlei et al: "An evidential sensor model for Velodyne scan grids", 2014 13th International Conference On Control Automation Robotics & Vision (ICARCV), IEEE, Dec. 10, 2014 (Dec. 10, 2014), pp. 583-588, XP032749159, DOI: 10.1109/ICARCV.2014. 7064369.
Extended European Search Report for Application No. EP 19 16 0260 dated Jan. 10, 2020.

* cited by examiner

METHOD OF MULTI-SENSOR DATA FUSION

CROSS REFERENCE TO RELATED APPLICATIONS

This application claims priority to European Patent Application 19160260.6 filed on Mar. 1, 2019.

BACKGROUND

The disclosure relates to a method of multi-sensor data fusion. A method for multi-sensor data fusion comprises that data is gathered from various sensors and then merged together. For example, different types of sensors can be used for acquiring sensor-specific views on an environment, wherein the sensor-specific views are fused into one single unified view. As the case may be, the sensor-specific views can be partially redundant and the aim of fusing can be to extract one unified view, which is more powerful than the individual views. For example, the unified view can be more reliable or can carry more information than each of the single views. The sensor-specific views may be represented in a sensor-specific format, which can deviate from the desired target format for the unified view.

In one specific example, modern automotive perception systems require multiple sensors which vary with respect to their type, e.g., there can be an image sensor for taking images or videos (e.g., a camera), another sensor formed by a radar system for taking "three-dimensional images" (sometimes denoted as point clouds comprising, e.g., depth and/or velocity information) by means of radar waves, and yet another sensor formed by a LiDAR-(light detection and ranging) system for providing further images by using laser rays. These sensors or other sensors are mounted on a vehicle at different mounting positions (e.g., front, rear or side). The images are thus captured from different viewpoints, i.e. from different perspectives. By using multi-sensor data fusion all the information captured by the different sensors should be merged in order to infer a precise and robust perception result. Various fusing algorithms are known from the art.

In recent years, models derived by machine learning, e.g. neural networks or the like, have found widespread use for processing image data. In particular, deep convolutional neural networks (CNNs) have achieved a great success for various perception tasks, e.g., object detection and semantic segmentation. In an automotive perception system, the input to a neural network can be for example a multi-dimensional tensor, e.g., a 2-D image with multiple channels or 3-D voxels, which is defined in a spatial coordinate system. A neural network does not change the spatial representation; the output is thus defined in the same coordinate system as the input.

If multiple sensors are used, each sensor output is usually processed separately by means of neural networks. This is because the sensor outputs may have different definitions and processing them together by means of one single neural network can reduce the accuracy. Therefore, fusing of the sensor outputs may involve a step of finding correspondences between objects or other information pieces between the processed sensor outputs (e.g., identifying the same object in two different feature maps). Despite some success it has been found that the robustness has still not reached a satisfactory level.

Accordingly there is a need to improve the accuracy of multi-sensor data fusion.

SUMMARY

An illustrative example method for multi-sensor data fusion includes:

determining a plurality of first data sets by means of a plurality of sensors, each of the first data sets being associated with a respective one of a plurality of sensor coordinate systems, and each of the sensor coordinate systems being defined in dependence of a respective one of a plurality of mounting positions of the sensors;

transforming the first data sets into a plurality of second data sets by means of a transformation rule, each of the second data sets being associated with at least one unified coordinate system, the unified coordinate system being defined in dependence of at least one predetermined reference point; and determining at least one fused data set by fusing the second data sets.

It has been found that the difference between the sensor-specific views and the desired target view after fusion is problematic and requires special attention. This applies at least when neural network technology is used for processing the individual sensor data sets, but is not limited to this aspect. A neural network has been found to be not suitable for processing multiple outputs from different sensors since their coordinate systems are inconsistent.

In principle, it would be possible to avoid the inconsistency by separate processing of the sensor data sets until the final fusion step. However, it has been found that this approach does not provide intermediate features in a common coordinate system. Instead, for example when using neural networks that include various layers, intermediate features are only provided with respect to the individual sensor coordinate systems. Therefore, some relevant information, which could be extracted by joint processing of the sensor outputs with respect to one common coordinate system, is lost. Therefore, even deep neural networks do not reach their full power.

One aspect is the transformation rule, which forms a link between the sensor coordinate systems and unified coordinate system. It is noted that the transformation rule may be regarded as a means for compensating or equalising the differences between the individual sensor coordinate systems with respect to the unified coordinate system. It has been found that this approach improves the overall accuracy of the multi-sensor data fusion.

In general, each of the sensors can have its own sensor coordinate system, i.e., each of the sensors is associated with a respective one of the sensor coordinate systems. For example, a camera may be associated with a projection coordinate system, while RADAR and/or LiDAR sensors may be associated with a Cartesian or Polar coordinate system. This is to say that each sensor coordinate system can depend on the type of sensor. In addition, each sensor coordinate system can depend on the mounting position of the corresponding sensor. In other words, each sensor can have its local coordinate system depending on its mounting position. In general, each of the sensors can be configured to capture an environment around the sensor.

The unified coordinate system can also be denoted as target coordinate system in which the target information, i.e., the fused data sets should be provided. The unified coordinate system can be, e.g., a Cartesian coordinate system. While in some applications only a single unified coordinate system may be used, a plurality of unified coordinate systems may be adopted for specific perception tasks.

In one application, the method may be incorporated into an automotive perception system, wherein the plurality of sensors are mounted on a vehicle. The outputs of the sensors, i.e. the first data sets may then be processed by means of neural networks, wherein the individual datasets are transformed from their respective sensor coordinate system to the unified coordinate system. Preferably, this transformation is applied before fusing of the transformed datasets, i.e. the second data sets. It is understood that each of the first and second data sets is preferably associated with the sensor, which is used for determining the respective data set. Therefore, when applying the transformation rule, it is known for each of the first datasets, which of the sensor coordinate systems is applicable.

In general, each of the first data sets and or each of the second data sets may comprise one or more data values. These data values can have any form and can be formed, for example by scalar values, which are associated with one or more coordinates that indicate the location in the corresponding coordinate system of the sensor. If for example one of the sensors is an image sensor, the data values may be formed by pixel values being associated with a respective position (e.g., coordinate values on an x-axis and a y-axis). In case of a radar system, the data values may be formed by points being associated with a respective position in the field of view of the radar sensor (the points may carry distance and/or depth information). The respective position can be defined in polar coordinates, i.e. by means of an angle and a radius.

The first and/or second data sets may also be denoted as data maps or feature maps, wherein each of the maps may comprise a plurality of points (i.e. data values), which together may also be interpreted as a point cloud.

In an embodiment, the transformation rule comprises a plurality of predetermined coordinate transformations for transforming data values from a respective one of the sensor coordinate systems to the unified coordinate system and vice versa, wherein the plurality of predetermined coordinate transformations are based on fixed relationships between the mounting positions and the at least one reference point. There can be, for example, one coordinate transformation for each of the sensors. The transformation rule and/or the coordinate transformations can be stored in a storage device.

The mounting positions and the at least one reference point are preferably defined in dependence of a vehicle, in particular wherein the reference point is located on a predetermined part (e.g., a front bumper or a rear axis) of the vehicle and the mounting positions are located in various predetermined parts of the vehicle that might be different from the part of the reference point. The fixed relationships can depend on the vehicle and can thus be encoded in the transformation rule in a predetermined manner. It is assumed that the relationships do not change over time. However, it can be provided that the fixed relationships are updated regularly or upon a relevant change. This can be the case, for example, when small deviations between a desired mounting position and a true mounting position become relevant, e.g. due to manufacturing tolerances or operational influences.

The transformation rule can comprise one or more transformation matrices, which are stored in a storage device, for example, in a vehicle. Each of the coordinate transformations can be associated with a transformation matrix that defines the coordinate transformation.

In another embodiment, the transformation rule comprises a mapping rule, which includes at least one definition of a plurality of first positions for the respective one of the sensor coordinate systems and a definition of a plurality of second positions for the unified coordinate system. In addition, the mapping rule also comprises a mapping of each of the second positions to at least some of the first positions. Each of the sensor coordinate systems can be associated with a respective definition of first positions and mappings. The definition of second positions is preferably constant.

Having further regard to the mapping rule, transforming a respective one of the first data sets can comprise determining, for each of the second positions, a target value for the respective second data set on the basis of source values of the respective first data set, the source values being located at the first positions that are mapped to the respective second position according to the mapping rule. Therefore, according to the mapping each of the second positions is associated with at least one or preferably a subset of the first positions. This can be regarded as defining a spatial correspondence between the underlying coordinate systems.

It is understood that the mapping is defined in a direction from the unified coordinate system to a respective sensor coordinate system, which has practical advantages. However, the mapping rule could in principle also be defined in the opposite direction.

The source values can be formed by data values in a respective one of the first data sets, wherein these data values are derived or defined by the first positions according to the mapping. If there are no data values at the first positions that are mapped to the respective second position then it can be provided that the nearest data values are selected as source values. For this purpose, one or more rounding operations can be incorporated into the mapping rule for selecting the source values from the respective first data set.

It may be provided that the first positions correspond to cells of a first regular grid, the first regular grid being adapted to the respective one of the sensor coordinate systems. In addition or alternatively, the second positions can correspond to cells of a second regular grid, the second regular grid being adapted to the unified coordinate system. Using grids allows for reducing the amount of involved data, wherein the principal complexity in the data sets is reduced to a limited number of cells or points. A respective cell can be formed by a predetermined area, which is defined by the grid.

The transformation rule can further comprise an interpolation rule, the interpolation rule being differentiable, and wherein determining of the target value comprises an interpolation from the source values, in particular wherein the interpolation is a bilinear interpolation. When using neural networks for processing the data sets it is preferred if the interpolation rule, which can be formed by an interpolation function, is differentiable. Therefore, an efficient and well-defined training of the neural network can be ensured in combination with the transformation rule.

In one example, at least one of the first data sets is associated with a sensor coordinate system being a Polar coordinate system, and wherein the unified coordinate system is a Cartesian coordinate system. The unified coordinate system can be a global coordinate system that is associated with a predefined object, in particular a vehicle. If the unified coordinate system is associated with a vehicle the coordinate system can also be denoted as vehicle coordinate system.

According to another embodiment determining of the first data sets comprises a step of acquiring a plurality of raw data sets by means of the plurality of sensors. In a further step, the first data sets can be extracted on the basis of the raw data sets, wherein the first data sets are extracted from the raw data sets by means of one or more neural networks or portions of a global neural network, in particular wherein the one or more neural networks or the global neural network are convolutional neural networks. It has been found that in some cases it is beneficial to do not apply the transformation rule to the raw data sets although this is possible in principle (in which case the raw data sets can be regarded as first data sets). Instead, it is preferred to extract the first data sets from the raw datasets by means of neural network technology. The resulting first data sets can also be regarded as feature maps, which is a common term in the field of neural networks. Although the raw data is processed by means of a neural network the resulting first data set can still represent comparably low-level features. Therefore, transformation to the unified coordinate system can still appear in an early stage of the overall processing chain. It is understood that the second data sets can also be denoted as second feature maps.

Before carrying out the fusing step the second data sets can be processed by means of one or more neural networks or portions of a global neural network, wherein the one or more neural networks or the global neural network are preferably formed by one or more convolutional neural networks. The fused data set can be processed further to extract semantic information, for example information on object boundaries or general segmentation data.

In general, the fused data set may be used as desired within the framework of an application. For example, if the data of multiple sensors mounted on a vehicle are processed then the fused data set can be used for automated control of a vehicle. In this way, automated driving applications, in particular autonomous driving can be made available.

In principle, there are different ways for fusing the second data sets. However, the following two strategies have been found useful in combination with the aspects described further above.

As one option fusing can comprise that at least some of the second data sets are stacked together and then processed further by means of a neural network, in particular a convolutional neural network. Preferably, all of the second data sets are stacked together. For example, the second data sets can be concatenated perpendicular to the dimensions of the data sets. The stacked data sets can form a tensor.

As another option a feature or data selective approach can be performed. This can be done when the second data sets are associated with a plurality of feature types, i.e. for a given sensor various first or second data sets are provided, wherein each of the first data sets corresponds to a feature type. Fusing can then comprise that groups (i.e. subsets) of second data sets are determined by stacking at least some, preferably all of the second data sets or portions thereof per feature type, wherein each of the groups of second data sets is processed by means of one or more neural networks or portions of a global neural network. The one or more neural networks or the global neural network are preferably convolutional neural networks.

As becomes apparent from the above the method or portions thereof are preferably performed by means of a neural network, in particular convolutional neural network. In particular, a plurality of neural networks can be employed and combined with the transformation rule. This is to say that the transformation step can be performed in a dedicated transformation module incorporated into a neural network or combined with several neural networks. The neural networks, as they are mentioned herein, can be distinct from each other. In this case, the networks can be numbered. However, it can be provided that some of the networks, for example the global networks are formed by one single network.

The disclosure further relates to a method for training a neural network for multi-sensor data fusion by using a gradient-based training method, comprising the following steps:—processing a gradient by means of a plurality neural networks or portions of a neural network—transforming the gradient between two adjacent ones of the neural networks or portions of the neural network by means of a predetermined transformation rule. The transformation can be the same as set forth further above.

According to another aspect of the disclosure a device for multi-sensor data fusion is provided, comprising: an input for receiving data sets from a plurality of sensors and an output for providing a fused data set or an information determined on the basis of the fused data set, wherein the device is configured to perform the method according to one of the preceding embodiments. The device can be formed by a processing device having a processor and a storage unit in which the instructions of the method are stored. When being executed these instructions cause the processor to perform the method.

According to a further aspect a vehicle is provided, which is configured to perform multi-sensor fusion. The vehicle comprises a plurality of sensors mounted on the vehicle at various mounting positions and a control unit being connected to the sensors, wherein the control unit is configured to control the vehicle in dependence of at least one fused data set that is determined by means of the device.

It is understood that features described in connection with the method can be realized in the device and vice versa.

DRAWINGS

Exemplary embodiments and functions of the present disclosure will be described in more detail in the following with reference to the drawings.

DETAILED DESCRIPTION

Figure 1:
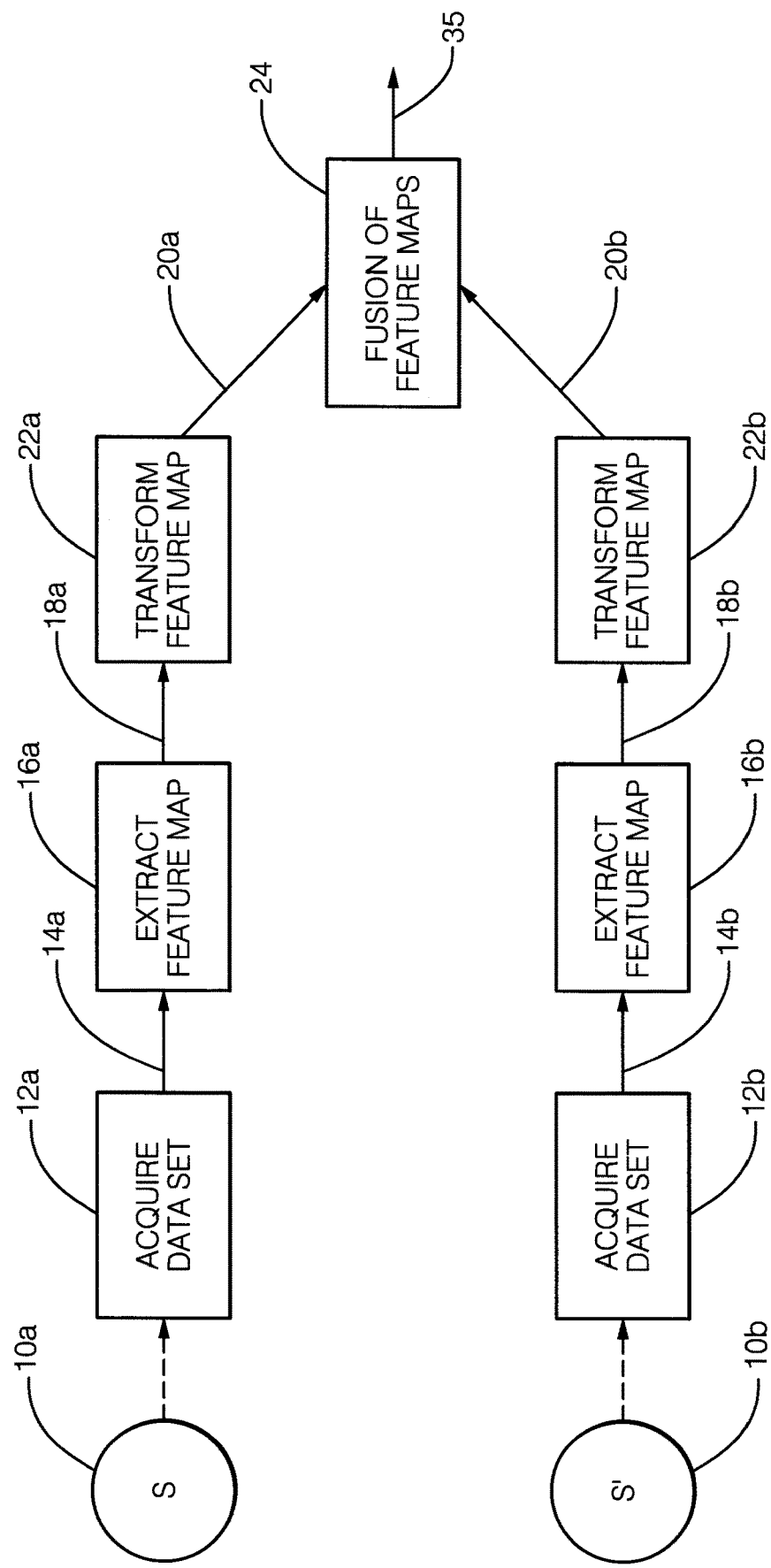
FIG. 1 is a schematic representation of an exemplary embodiment of a method for multi-sensor data fusion.

In FIG. 1, a method for multi-sensor data fusion is illustrated, wherein two sensors 10*a* and 10*b* are mounted at predetermined mounting positions on a device (not shown). The sensors 10*a*, 10*b* are also denoted as S and S' in FIG. 1. It is understood that also more than two sensors can be used. The sensor 10*a* can be, e.g., a camera for taking two-dimensional images. The other sensor 10*b* can be a radar sensor for taking radar images comprising velocity information. These radar images are sometimes denoted as point clouds.

By means of the sensors 10*a* and 10*b* raw data sets 14*a* and 14*b* are acquired in steps 12*a* and 12*b*, respectively. Each of the raw data sets 14*a*, 14*b* can comprise a plurality of data points, each of the points being associated with a spatial position (see, e.g. maps 15 in FIG. 2). The data points can be formed by pixel values (for example when the sensor is an image sensor) or detection points acquired by means of radar (radar sensor) or other electromagnetic waves, for example laser (Lidar).

First feature maps 18a and 18b are extracted from the raw datasets 14a and 14b in steps 16a and 16b, respectively. The first feature maps 18a, 18b can be extracted by using a predefined computer-implemented model that is trained before the desired use by way of machine learning, i.e. the model used for extraction can be formed, e.g., by a neural network or the like. The models used in steps 16a, 16b can be the same or different.

The first feature maps 18a, 18b represent data sets and can generally comprise a plurality of data points. The structure of the first feature maps 18a, 18b can be the same or similar to the structure of the raw data sets 14a, 14b. However, the feature maps 18a, 18b also comprise one or more representations of features in a dedicated sensor coordinate system. In particular, the feature maps 18a represent feature data (e.g., data points with some meaning or reliability) in a sensor coordinate system of the sensor 10a. Likewise, the feature map 18b represents feature data in a sensor coordinate system of the sensor 10b. These sensor coordinate systems, of which more details will be explained below, are defined in dependence of the respective mounting positions of the sensors 10a, 10b.

In steps 22a, 22b, the feature maps 18a and 18b are transformed into a unified coordinate system, i.e. the data of the feature maps 18a and 18b is represented in the same coordinate system after the transformation. The unified coordinate system is preferably defined independently from the sensor coordinate systems of sensors 10a, 10b. Instead, the unified coordinate system is defined in dependence of a predetermined reference point at an object, for example a predetermined position on a vehicle.

The transformed feature maps 20a and 20b are denoted as second feature maps. The second feature maps 20a, 20b are then fused together in step 24. This results in at least one fused data set 35.

Figure 2:
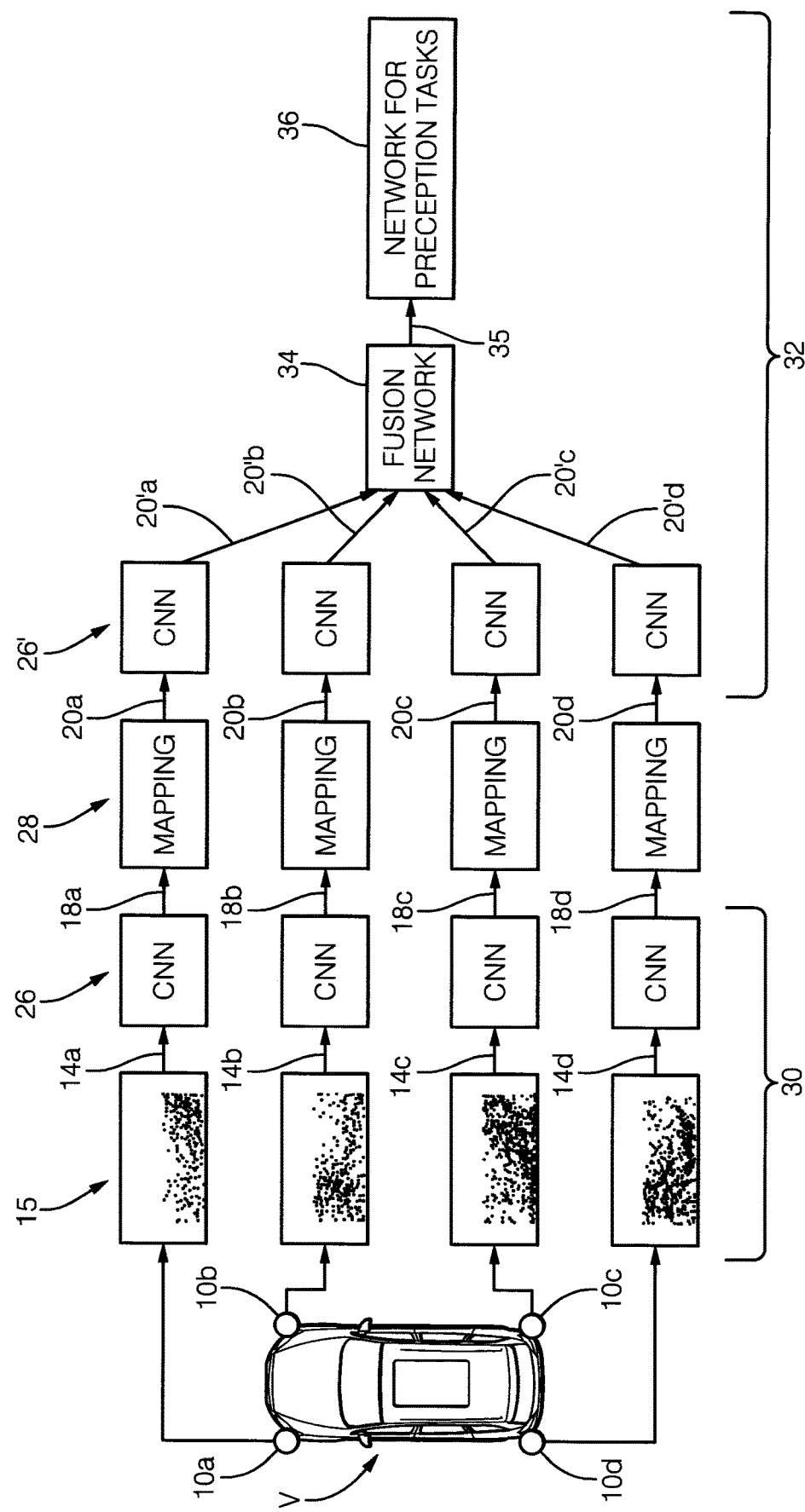
FIG. 2 is a schematic representation of a further embodiment of a method for multi-sensor data fusion.

In FIG. 2, a further embodiment of a method for sensor data fusion is illustrated. A plurality of maps 15 are acquired by means of four sensors 10a, 10b, 10c, 10d, which are all mounted at the outer corners of a vehicle V. This arrangement is merely an example and any suitable mounting position can be selected for mounting, i.e. installing the sensors on the vehicle V. In FIG. 2, the maps 15 corresponds to raw data sets 14a, 14b, 14c, and 14d, wherein the maps 15 can be interpreted as visualizations of the raw data sets 14a, 14b, 14c, and 14d.

Each of the data sets 14a, 14b, 14c, 14d is then processed by a respective one of convolutional neural networks 26. This step can be interpreted as a feature extraction (cf. steps 16a, 16b in FIG. 1), which results in a plurality of first feature maps 18a, 18b, 18c and 18d, wherein feature map 18a corresponds to the processed version of the raw dataset 14a, feature map 18b corresponds to the processed version of the raw data set 14b, and so forth.

A plurality of mappings 28 is then applied to the first feature maps 18a, 18b, 18c, and 18d. In particular, each of the mappings 28 corresponds to a step where a dedicated mapping rule is applied to the underlying one of the first feature maps 18a, 18b, 18c, 18d. This is to say that each of the first feature maps 18a, 18b, 18c, 18d is transformed by a transformation rule, which is defined in dependence of the respective one of the sensors 10a to 10d that is used for providing the respective one of the first feature map 18a to 18d. In the example of FIG. 2, the mapping for the first feature map 18a depends on the mounting position of sensor 10a. Likewise, the mapping applied to the first feature map 18b depends on the mounting position of sensor 10b. In the same manner, the mappings for feature maps 14c and 14d depend on the mounting positions of sensors 10c and 10d, respectively. As already indicated in connection with FIG. 1, the first feature maps 18a to 18d are all associated with respective sensor coordinate systems. In contrast, the transformed feature maps 20a to 20d are all represented in the same unified coordinate system. Therefore, processing of the sensor outputs comprises a sensor coordinate phase 30 and subsequent to the mappings 28 a unified coordinate phase 32. Exemplary details of the transformation rule, i.e. the mappings 28 will be described in connection with FIG. 3 further below.

The outputs of the mappings 28 are second feature maps 20a, 20b, 20c, and 20d. The second feature maps 20a, 20b, 20c, 20d are then processed further by means of convolutional neural networks 26', which gives processed versions 20'a, 20'b, 20'c, and 20'd of the second feature maps 20a, 20b, 20c, and 20d. The networks 26 are configured to refine the features further and to prepare them for fusing them together by means of a fusion network 34. Examples of a fusion network 34 are addressed further below in connection with FIGS. 4 and 5. The resulting fused feature map 35 is then processed further by means of one or more networks 36, e.g. neural networks, for performing a predefined perception task, which may include a semantic segmentation in order to identify object boundaries in the fused feature map 35.

It is understood that processing of the maps 15 remains separated until fusing of the feature maps 20'a to 20'd. However, the mappings 28 are applied already before the fusing, which allows for an improved subsequent processing in view of obtaining a high accuracy for the desired perception task.

Figure 3:
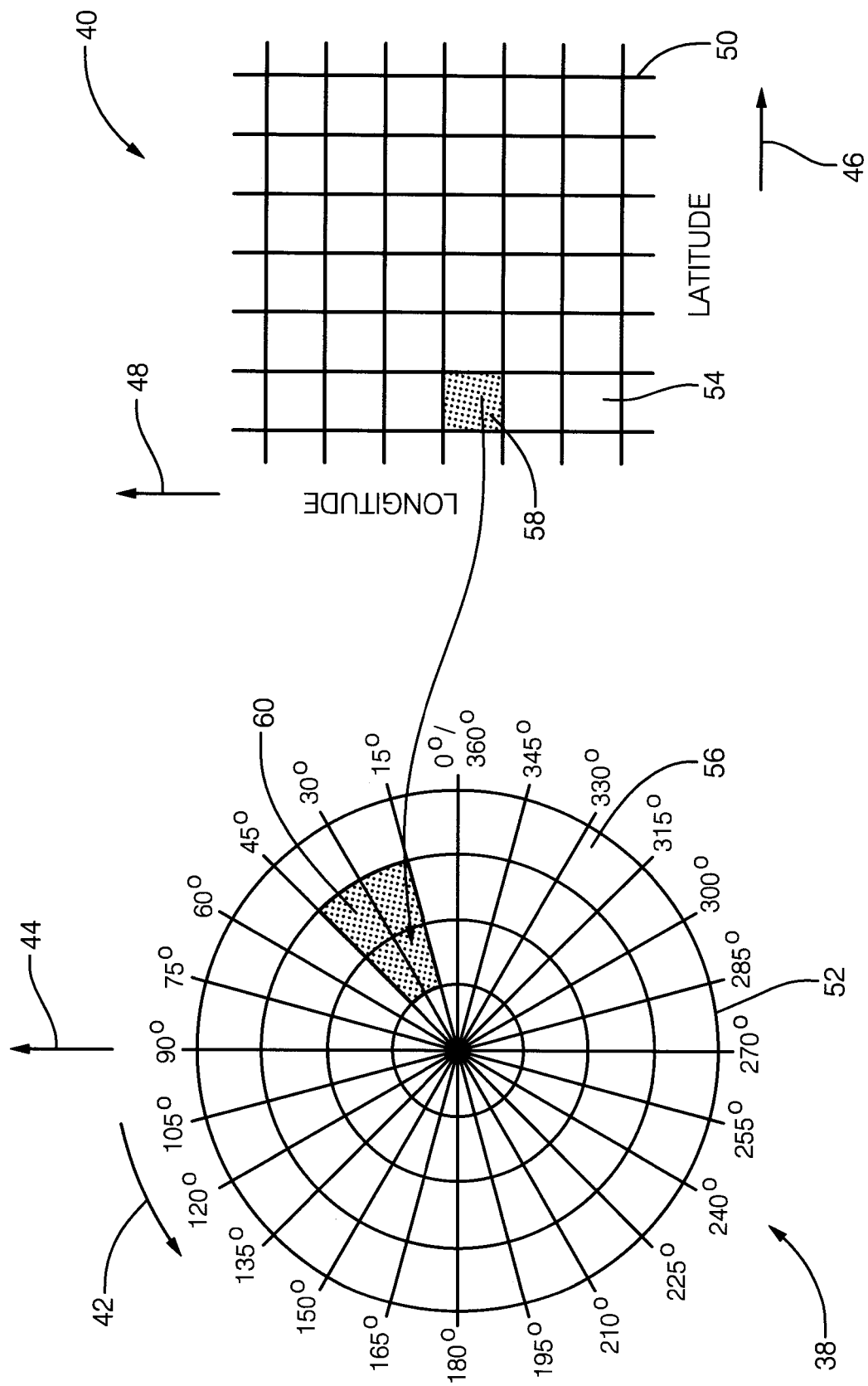
FIG. 3 is a schematic representation of an aspect of a method for multi-sensor data fusion.

Exemplary details of the transformation rule are shown in FIG. 3, which basically visualizes one of the mappings 28 from FIG. 2. On the left side of FIG. 3 a sensor coordinate system 38 is shown, which is a Polar coordinate system. This means that the location of data points are described in the coordinate system 38 by means coordinate values having the dimensions angle 42 and radius 44. On the right side of FIG. 3 a unified coordinate system 40 is shown, which is a Cartesian coordinate system. The unified coordinate system 40 includes an x-axis 46 (latitude) and a y-axis 48 (longitude) in orthogonal relation to each other. In order to further illustrate the nature of transformation the unified coordinate system 40 is provided with a grid 50, which defines a plurality of cells 54. These cells 54 correspond to squares having a regular size in order to indicate discrete positions in the unified coordinate system. Preferably, the position of each of the cells 54 is described by a pair of integer coordinate values with respect to the x-axis and the y-axis.

The sensor coordinate system 38 is provided with another grid 52, which is adapted to the type of coordinate system, namely Polar coordinate system. The grid 52 defines a plurality of cells 56, which have a trapezoidal shape. The size of the cells 56 is increasing with increasing radius 44.

The definition of the transformation rule is now described for a respective one of the cells 54, namely target cell 58. The target cell 58 corresponds to the position of a data value that is part of one of the second feature maps 14a to 14d. The feature value of target cell 58 is determined on the basis of data values being associated with source cells 60 in the sensor coordinate system 38. In FIG. 3, the target cell 58 is mapped to source cells 60, as indicated by the arrow. This mapping represents the general spatial relationship between the data values that are located at the underlying cells 58 and 60. In addition to the mapping, the data value of the target cell 58 can be interpolated from the data values that match with the source cells 60. Preferably, a bilinear interpolation is used.

From the definition of the target cell 58 in dependence of the source cells 60 it is understood that the transformation of the first feature maps 18a to 18d to the second feature maps 20a to 20d is performed in a reverse direction. This means that for every cell 54, e.g. cell 58, in the unified coordinate system 40, associated cells 60 are identified in the sensor coordinate system 38.

Under the assumption that the sensor coordinate system 38 and the unified coordinate system 40 are aligned to the same origin the relationship between Polar coordinates ($R_i$, $A_i$), i.e. radius 44 and angle 42, and Cartesian coordinates ($X_i$, $Y_i$), i.e. x-axis 46 and y-axis 48 can be expressed as follows:

$$R_i = \text{sqrt}(X_i * X_i + Y_i * Y_i),$$

$$A_i = \arctan(X_i/Y_i),$$

wherein sqrt( ) denotes the square root function and arctan( ) denotes the inverse tangent function. It is understood that although the coordinates ($X_i$, $Y_i$) are set to integer values the resulting coordinate values ($R_i$, $A_i$) will usually be float values. Therefore, an interpolation can be used in order to increase the accuracy.

As indicated further above, a bilinear interpolation is preferred. From the above equations, float values ($R_i$, $A_i$) are determined. However, the first feature maps 18a to 18d may only comprise data values at integer coordinate values. The source cells 60 can then be determined by rounding operations: (floor($R_i$), floor($A_i$)), (floor($R_i$), ceil($A_i$)), (ceil($R_i$), floor($A_i$)), and (ceil($R_i$), ceil($A_i$)), where floor( ) and ceil( ) are the rounding operations (floor( ) is rounding down, and ceil( ) is rounding up). The corresponding cell values of the source cells 60 are denoted as $V_{ff}$, $V_{fc}$, $V_{cf}$, $V_{cc}$.

The bilinear interpolation of the target feature value of cell 58 can be formulated as:

$$V(X_i,Y_i) = V(R_i,A_i) = 1/((\text{ceil}(R_i) - \text{floor}(R_i))*(\text{ceil}(A_i) - \text{floor}(A_i)))*[\text{ceil}(R_i) - R_i$$

$$R_i - \text{floor}(R_i)]*[V_{ff}\, V_{fc}\, V_{cf}\, V_{cc}]*[\text{ceil}(A_i) - A_i - \text{floor}(A_i)]',$$

wherein [ ] denote vectors and [ ]' denotes transpose of the vector. The operator * denotes a multiplication.

Figure 4:
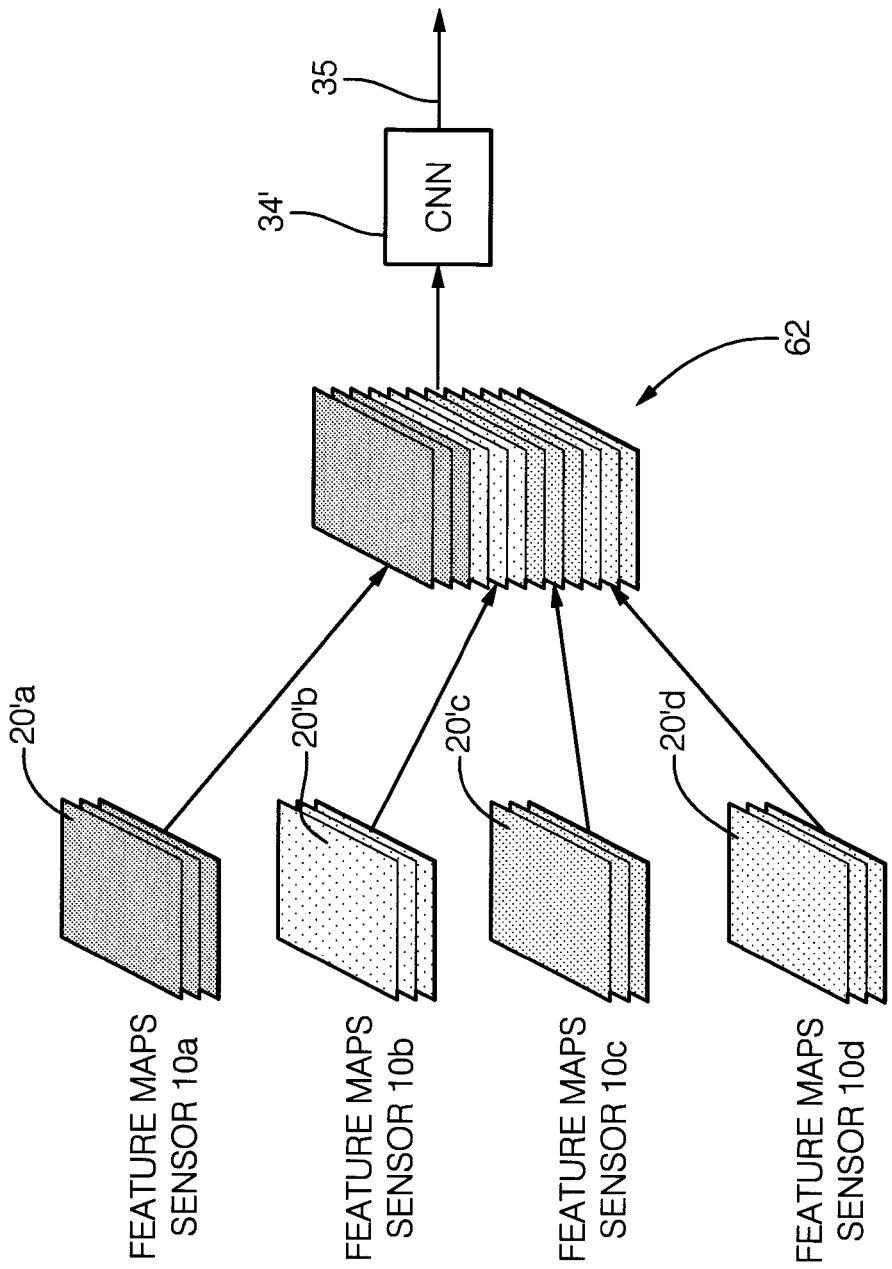
FIG. 4 is a schematic representation of a further aspect of a method for multi-sensor data fusion.

Turning to FIG. 4, an embodiment of the fusion network 34 is illustrated from the viewpoint of operation. The second feature maps 20'a to 20'd (cf. FIG. 2) are stacked together, which gives a stack 62. This stack can be interpreted as a matrix or tensor matrix. The stack 62 is then processed by means of a convolutional network 34', with the fused data set 35 forming the output.

Figure 5:
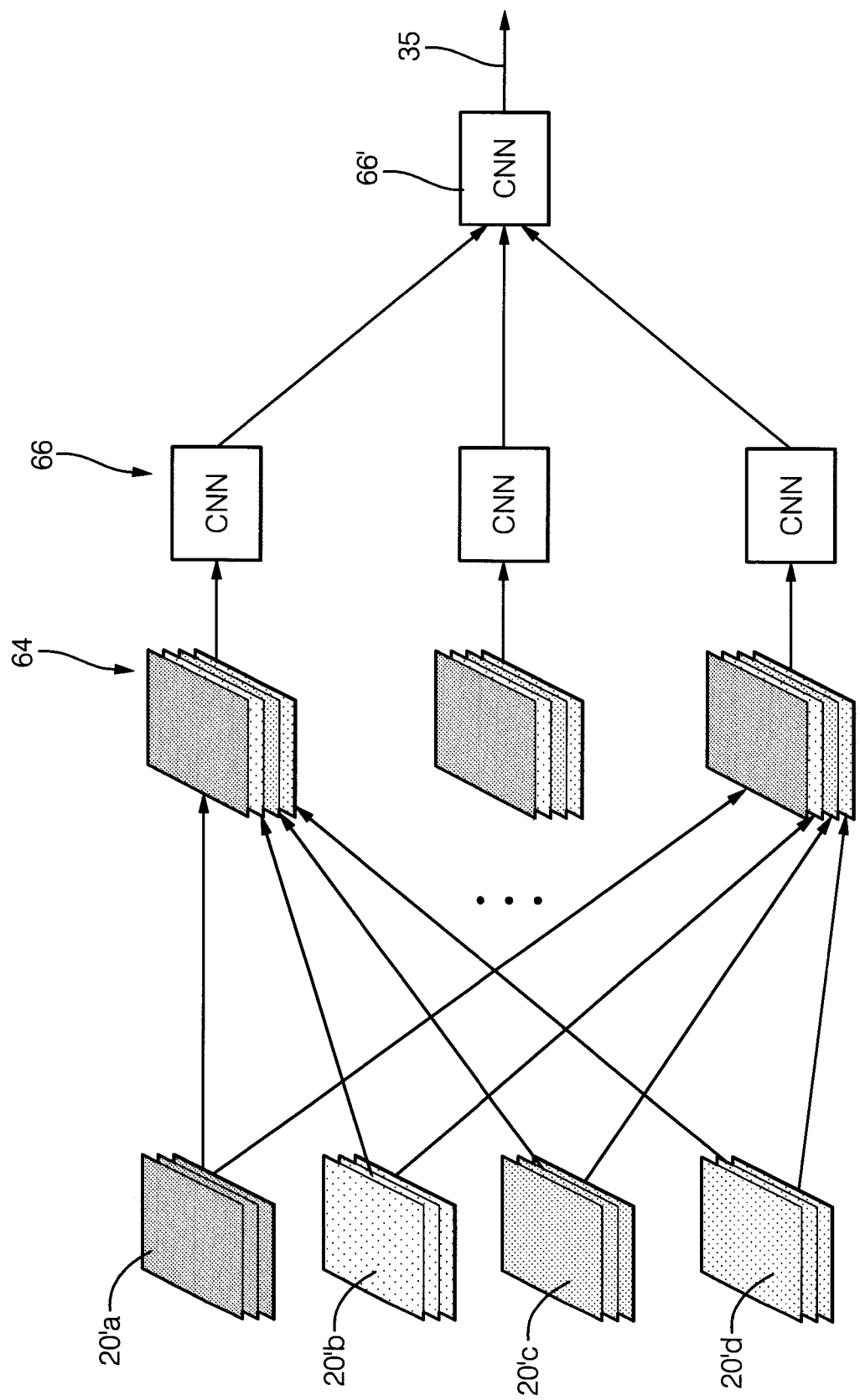
FIG. 5 is a schematic representation of yet another aspect of a method for multi-sensor data fusion.

As an alternative to the network of FIG. 4, the network structure illustrated in FIG. 5 can be used for implementing the fusion network 34. The second feature maps 20'a to 20'd are first grouped per feature type giving a plurality of stacks 64, each of the stack 64 comprising the second feature maps that correspond to one of the features. The stacks 64 are then processed individually by means of convolutional neural networks (CNNs) 66, the outputs of which are then stacked together and processed by means of a further convolutional neural network 66'. The output of the neural network 66' is the fused feature map 35.

It is understood that the exemplary aspects described in connection with the figures are not limiting the general aspects described without specific reference of the figures. However, aspects described in the figures can be partially realized in connection with one or more of the general aspects.

The invention claimed is:

1. A method of multi-sensor data fusion, the method comprising:
    determining a plurality of first data sets using a plurality of sensors, each of the first data sets being associated with a respective one of a plurality of sensor coordinate systems, each of the sensor coordinate systems being defined in dependence on a respective one of a plurality of mounting positions of the sensors;
    transforming the first data sets into a plurality of second data sets using a transformation rule that includes a target value for each second data set, the target value being based on at least one position of a corresponding one of the first data sets that is mapped to a position of the second data set, each of the second data sets being associated with a unified coordinate system, the unified coordinate system being defined in dependence on at least one predetermined reference point; and
    determining at least one fused data set by fusing the second data sets.

2. The method as claimed in claim 1,
    wherein the transformation rule comprises a plurality of predetermined coordinate transformations for transforming data values between the respective one of the sensor coordinate systems and the unified coordinate system, wherein the plurality of predetermined coordinate transformations are based on fixed relationships between the mounting positions and the at least one reference point,
    wherein the mounting positions and the at least one reference point are defined in dependence on a vehicle, and
    wherein the reference point is located on a predetermined part of the vehicle and the mounting positions are located at a plurality of parts of the vehicle.

3. The method as claimed in claim 1, wherein
    the transformation rule comprises a mapping rule,
    the mapping rule includes
        at least one definition of a plurality of first positions for the respective one of the sensor coordinate systems,
        a definition of a plurality of second positions for the unified coordinate system, and
        a mapping of each of the second positions to at least some of the first positions, and
    wherein transforming a respective one of the first data sets comprises determining the target value for each second data set on the basis of a plurality of source values of the respective first data set, the source values being located at first positions that are mapped to the respective second position according to the mapping rule.

4. The method as claimed in claim 3,
    wherein the first positions correspond to cells of a first regular grid, the first regular grid being adapted to the respective one of the sensor coordinate systems, and/or
    wherein the second positions correspond to cells of a second regular grid, the second regular grid being adapted to the unified coordinate system.

5. The method as claimed in claim 3,
    wherein the transformation rule comprises an interpolation rule, the interpolation rule being differentiable,
    wherein determining the target value comprises an interpolation from the source values, and
    wherein the interpolation is a bilinear interpolation.

6. The method as claimed in claim 1, wherein at least one of the first data sets is associated with a sensor coordinate system that is a Polar coordinate system, and wherein the unified coordinate system is a Cartesian coordinate system.

7. The method as claimed in claim 1, wherein determining the plurality of first data sets comprises:
acquiring a plurality of raw data sets using the plurality of sensors, and
extracting the first data sets based on the raw data sets, wherein the first data sets are extracted from the raw data sets by at least one first neural network or portions of a first global neural network, wherein the at least one first neural network or the first global neural network is a first convolutional neural network.

8. The method as claimed in claim 1,
wherein, before the fusing, the second data sets are processed by at least one second neural network or portions of a second global neural network, wherein the at least one second neural network or the second global neural network is a second convolutional neural network, and
wherein the at least one fused data set is processed to extract semantic information.

9. The method as claimed in claim 1, wherein the fused data set is used for automated control of a vehicle.

10. The method as claimed in claim 1, wherein the fusing comprises stacking together at least some of the second data sets and then further processing the at least some of the second data sets by a third convolutional neural network.

11. The method as claimed in claim 1, wherein the second data sets are associated with a plurality of feature types, wherein the fusing comprises determining groups of the second data sets by stacking at least some of the second data sets or portions thereof per feature type, wherein each group of the second data sets is processed by at least one fourth neural network or portions of a fourth global neural network, wherein the at least one fourth neural network or the fourth global neural network is a fourth convolutional neural network.

12. The method as claimed in claim 11, wherein the method or portions thereof are performed by a fifth neural network, comprising a fifth convolutional neural network.

13. A device for multi-sensor data fusion configured to perform the method according to claim 1, the device comprising:
an input for receiving data sets from a plurality of sensors, and
an output for providing the fused data set or an information determined based on the fused data set.

14. A vehicle comprising the device as claimed in claim 13,
wherein the vehicle comprises the plurality of sensors mounted on the vehicle at a plurality of mounting positions and a control unit connected to the sensors, and
wherein the control unit is configured to control the vehicle in dependence on at least one fused data set determined by the device.

15. A method of multi-sensor data fusion, the method comprising:
determining a plurality of first data sets using a plurality of sensors, each of the first data sets being associated with a respective one of a plurality of sensor coordinate systems, each of the sensor coordinate systems being defined in dependence on a respective one of a plurality of mounting positions of the sensors;
transforming the first data sets into a plurality of second data sets using a transformation rule that comprises a mapping rule, each of the second data sets being associated with a unified coordinate system, the unified coordinate system being defined in dependence on at least one predetermined reference point; and
determining at least one fused data set by fusing the second data sets,
wherein
the mapping rule includes
at least one definition of a plurality of first positions for the respective one of the sensor coordinate systems,
a definition of a plurality of second positions for the unified coordinate system, and
a mapping of each of the second positions to at least some of the first positions, and
wherein transforming a respective one of the first data sets comprises determining, for each of the second positions, a target value for the respective second data set on the basis of a plurality of source values of the respective first data set, the source values being located at first positions that are mapped to the respective second position according to the mapping rule.

16. The method as claimed in claim 15, wherein
the first positions correspond to cells of a first regular grid, the first regular grid being adapted to the respective one of the sensor coordinate systems, and/or
the second positions correspond to cells of a second regular grid that is adapted to the unified coordinate system.

17. The method as claimed in claim 15, wherein
the transformation rule comprises a differentiable interpolation rule,
determining the target value comprises an interpolation from the source values, and
the interpolation is a bilinear interpolation.

* * * * *